United States Patent [19]
Jang et al.

[11] Patent Number: 5,828,651
[45] Date of Patent: Oct. 27, 1998

[54] DEVICE FOR DUPLICATING CONNECTIONLESS SERVER

[75] Inventors: Se-In Jang, Euiwang; Seong-Rak Choi, Seoul, both of Rep. of Korea

[73] Assignee: SamSung Electronics Co., Ltd., Suwon, Rep. of Korea

[21] Appl. No.: 775,112

[22] Filed: Dec. 30, 1996

[30] Foreign Application Priority Data

Dec. 28, 1995 [KR] Rep. of Korea ................. 1995/61240

[51] Int. Cl.$^6$ .................................................. H04L 12/56
[52] U.S. Cl. ...................... 370/219; 370/220; 370/221; 370/241; 370/355
[58] Field of Search ..................................... 370/221, 217, 370/241, 250, 218, 219, 220, 355, 395, 432

[56] References Cited

U.S. PATENT DOCUMENTS

| 5,280,476 | 1/1994 | Kojima et al. | 370/397 |
| 5,299,293 | 3/1994 | Mestdagh et al. | 370/221 |
| 5,379,278 | 1/1995 | Safadi | 370/221 |
| 5,513,314 | 4/1996 | Kandasamy et al. | 395/182.04 |
| 5,548,589 | 8/1996 | Jeon et al. | 370/399 |
| 5,638,364 | 6/1997 | Sugita | 370/397 |
| 5,701,300 | 12/1997 | Jeon et al. | 370/395 |

*Primary Examiner*—Min Jung
*Attorney, Agent, or Firm*—Robert E. Bushnell, Esq.

[57] ABSTRACT

A device for duplicating a connectionless server whose reliability and performance are improved includes a physical hierarchy processor for converting connectionless input data into an electric signal, outputting the matching signals by ATM physical hierarchy processing of the converted signal, and processing the input signals in its reverse order; a duplication cell processor for performing a header conversion processing operation with respect to an input cell of the matching signals according to its destination address, and enabling only buffers of one-side cell processor according to a signal state decided by an inner duplication state decider, with respect to the cell which completes the header conversion processing operation; and a duplication controller for maintaining, repairing, multi-casting and connection-controlling cells applied from the duplication cell processor, the duplication controller enabling and outputting only buffers of one-side controller according to a signal state decided by the inner duplication state controller, with respect to the processed cell.

16 Claims, 5 Drawing Sheets

DEVICE FOR DUPLICATING CONNECTIONLESS SERVER

CLAIM OF PRIORITY

This application claims all benefits accruing under 35 U.S.C. §119 from an application for DEVICE FOR DUPLICATING CONNECTIONLESS SERVER earlier filed in the Korean Industrial Property Office on Dec. 28, 1995 and there duly assigned Ser. No. 61240/1995.

BACKGROUND OF THE INVENTION

1. Field of the Invention

The present invention relates to an asynchronous transfer mode (hereinafter, referred to as ATM) network and, more particularly, to a device for duplicating a connectionless server which enhances its reliability, the server servicing connectionless data.

2. Description of the Related Art

As the ATM network has come into wide use, a primary concern is to accommodate the existing networks like a local area network (hereinafter, referred as to LAN), a public switched telephone network (hereinafter, referred as to PSTN), etc., to the ATM network.

Since a connection data service is presupposed in the LAN environment, much research on operating the ATM network on the basis of the connection data service has been made. For example, ATM FORUM has conducted a research about a LAN emulation for implementing a high speed ATM-LAN by emulating the MAC hierarchy of the existing LAN, Internet Engineering Task Force (IETF) about an address resolution (AR) and frame encapsulation method for transferring an internet protocol (IP) data program to the ATM network, and ITU-T about protocols for serving a connectionless broadband data service (CBDS) using the connectionless server.

The connectionless server performs a routing function for converting the connectionless data, input through an interworking function (IWF) connected to the server one by one, into a destination address of an E.164 form to transfer it to the destination IWF via a cybernetic connection in a manner appropriate to the public network.

As illustrated in FIG. 1, the prior art connectionless server having the above function includes a cell processing board 2 and a control serve board 4. The cell processing board 2 also includes a light transceiver 6, a physical hierarchy processor 8 and a header conversion processor 10 in this application, the term "light" refers to all optical signals including light signals, infrared signals, and any similar optical signals.

In the cell processing board 2, the light transceiver 6 transforms a light signal into an electric signal after receiving it from an external light link to output it to the physical hierarchy processor 8. Also, the light transceiver 6 reversely transforms the electric signal output from the physical hierarchy processor 8 into a light signal to output it to the external light link. The physical hierarchy unit 8 performs the ATM physical hierarchy functions of extracting an ATM cell from the data stream of the electric signal output from the light transceiver and sensing the data error through the header checker sequence (HCS). The physical hierarchy processor 8 uses a common chip PM5346 SUNI CHIP. The header conversion processor 10 performs the functions of converting the cell output from the physical hierarchy processor 8 into virtual path identifier (VPI)/virtual channel identifier (VCI)/message identifier (MID) values according to the destination address, transferring the transformed cell to the physical hierarchy processor 8, and discerning multi-casting cell to transfer it to the control serve board 4.

The control serve board 4 of FIG. 1 performs the functions of maintaining, repairing, multi-casting and connection-controlling the OAM (Operation, Administration and Maintenance) and multi-casting cell input while connecting with the cell processing board 2.

In the meantime, signals for giving and taking mutual operation among blocks are as shown below. First, there are signals A for matching the physical hierarchy processor with the header conversion processor. The signals include TSOC, TDAT(0:7), TCA, TWRENB, RSOC, RDAT(0:7), RCA, RRENB, etc., corresponding to the PM5346 SUNI CHIP (refer to the PM5346 SUNI CHIP data book). There are also signals B for transferring the OAM and multi-casting cell from the control serve board 4 to the header conversion processor 10. The signals include 16 bit transmission/receiving buses TD(0:15) and RD(0:15), a one bit signal for informing of the start of the transmission/receiving cell TSOC and RSOC, a one bit signal for informing of the end of the transmission/receiving cell TEOC and REOC, and signals for reading/writing the data FRD/FWR(FIFO Read/FIFO Write). FIG. 7 shows timing diagrams of the signals.

However, since the prior art server is single-structured, there are problems in operating, maintaining and repairing the server including the problem that, when any server error occurs, the operation of the server stops until it is replaced with a normal server.

SUMMARY OF THE INVENTION

Accordingly, an object of the present invention is to provide a device for duplicating a connectionless server in which the above problems are solved.

Another object of the present invention is to provide a device for duplicating a connectionless server whose reliability and performance are improved.

To achieve the above object according the present invention, there is provided a device for duplicating a connectionless server, comprising: a physical hierarchy processor for converting connectionless input data into an electric signal, outputting the matching signals by ATM physical hierarchy processing of the converted signal, and processing the input signals in its reverse order; a duplication cell processor for performing a header conversion processing operation with respect to an input cell of the matching signals according to its destination address, and enabling only buffers of one-side cell processor according to a signal state decided by an inner duplication state decider, with respect to the cell which completes the header conversion processing operation; and a duplication controller for maintaining, repairing, multi-casting and connection-controlling cells applied from the duplication cell processor, the duplication controller enabling and outputting only buffers of one-side controller according to a signal state decided by the inner duplication state controller, with respect to the processed cell.

BRIEF DESCRIPTION OF THE DRAWINGS

The accompanying drawings, which are included to provide a further understanding of the invention and are incorporated in and constitute a part of this specification, illustrate a particulate embodiment of the invention and, together with the description, serve to explain the principles of the invention. In the drawings.

DETAILED DESCRIPTION OF THE PREFERRED EMBODIMENT

Reference will now be made in detail to the preferred embodiments of the present invention, examples of which are illustrated in the accompanying drawings.

In the active/stand-by mode duplication system of the present invention, hardware is added to the system and simultaneously operated under the mutual hardware observation. Thus, when any error is found in the active hardware, it is quickly switched to the stand-by hardware so that the normal operation can be maintained.

Figure 1:
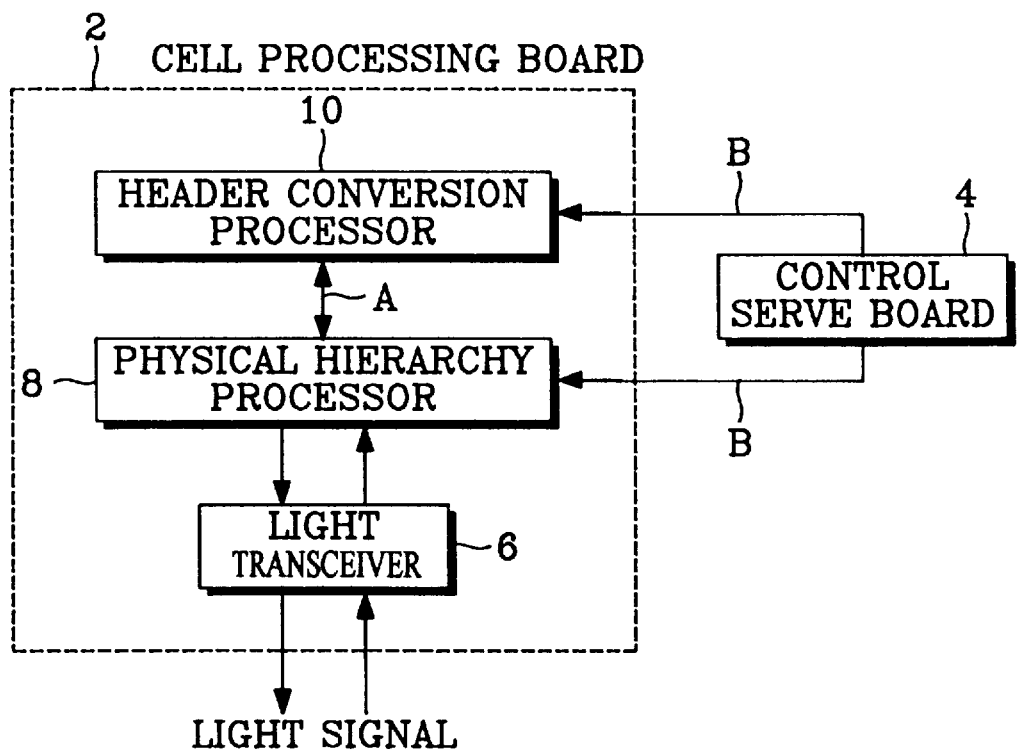
FIG. 1 is a block diagram showing the prior art connectionless server.
Figure 2:
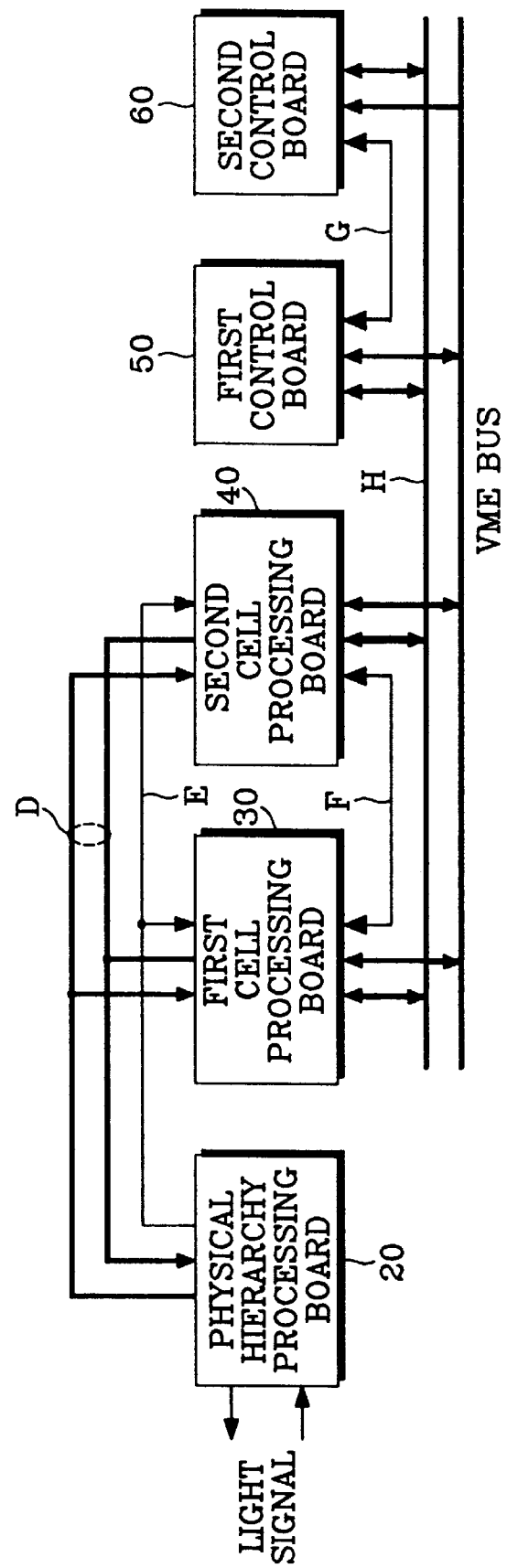
FIG. 2 is a block diagram showing a device for duplicating a connectionless server according to the present invention.

As illustrated in FIG. 2, the duplication system includes a physical hierarchy processing board 20, duplication cell processing boards 30 and 40, and duplication control boards 50 and 60.

An external light link is single while resources of the system are dual. The physical hierarchy processing board 20 performs the functions of distributing signals to the duplication boards and collecting them to match the resources with the external light link.

Figure 3:
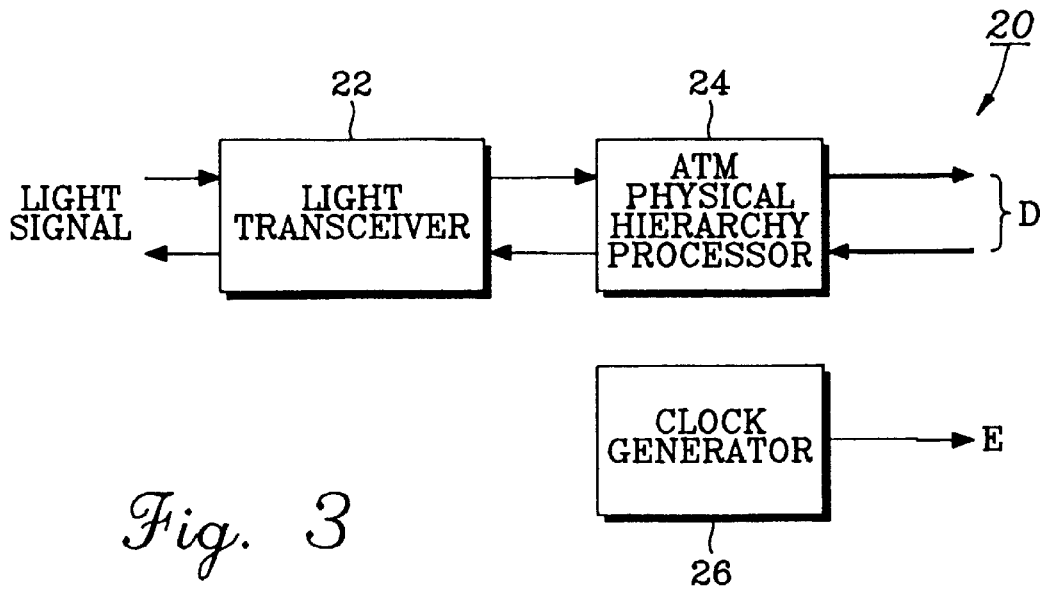
FIG. 3 is a detailed block diagram showing the physical hierarchy board of FIG. 2.

As illustrated in FIG. 3, the physical hierarchy processing board 20 includes a light transceiver 22, an ATM physical hierarchy processor 24 and a clock generator 26. In this structure, interfaces with other boards include a light link for transmitting and receiving light signals, an 8 bit unipolar match signal D for matching the duplication cell processing boards 30 and 40 with each other, and a 20 MHz base clock E for supplying a cell processing base clock to the duplication cell processing boards 30 and 40.

Figure 4:
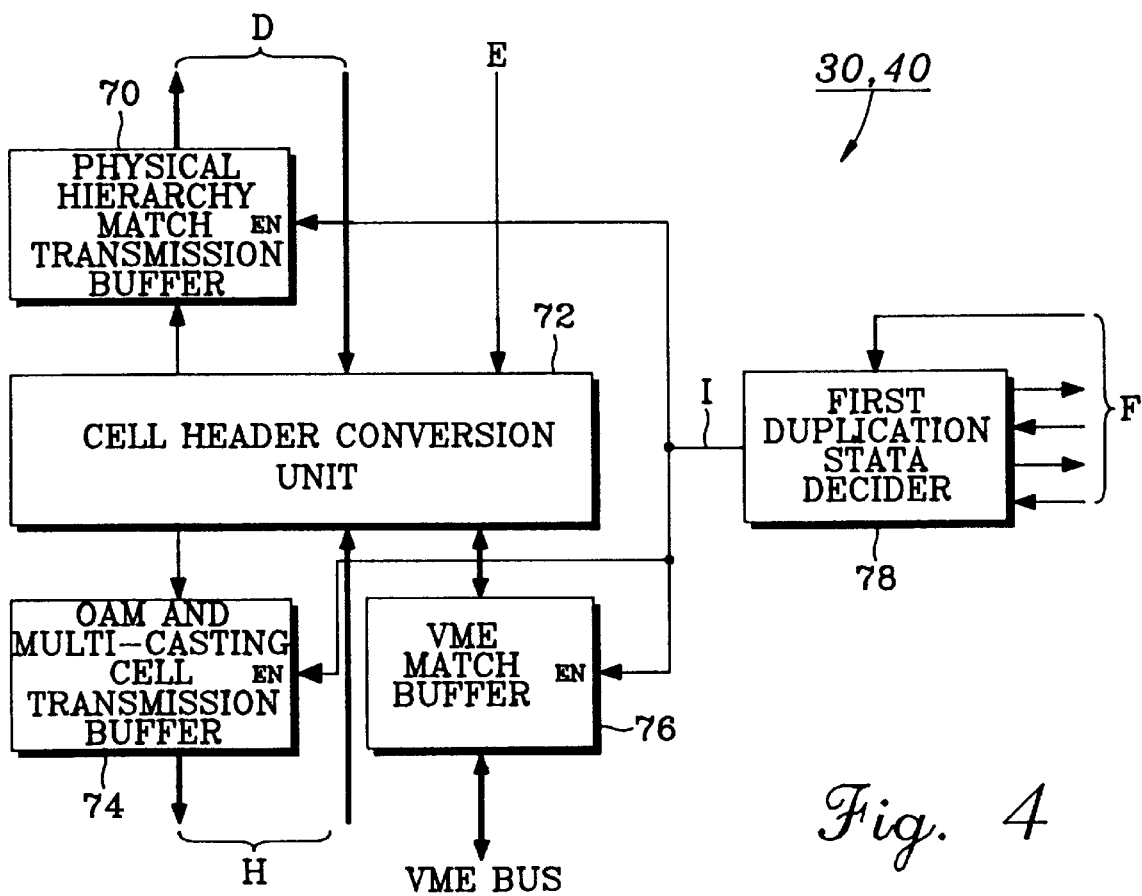
FIG. 4 is a detailed block diagram showing the cell processing boards 30 and 40 of FIG. 2.

As illustrated in FIG. 4, the cell processing boards 30 and 40 each include a physical hierarchy match transmission buffer 70, a cell header conversion unit 72, an OAM and multi-casting cell transmission buffer 74, a VME match buffer 76 and a first duplication state decider 78. Signals for externally matching the cell processing boards 30 and 40 include a VME bus match signal for matching the cell processing boards with the control boards 50 and 60, and an OAM and multi-casting cell match signal H, i.e., TSOC, TDATA(0:15), TWR, TEOC, RSOC, RDATA(0:15), RRD, REOC and etc. The match signals also include an 8 bit unipolar match signal E for transmitting/receiving data to/from the physical hierarchy processing board 20, i.e., $\overline{\text{TWREN}}$, TD(0:7), TSOC, TCA, $\overline{\text{RRDEN}}$, RD(0:7), RSOC, RCA, etc. The signals also include a clock signal(20 M CLK) E supplied from the physical hierarchy processing board 20, and signals F for deciding the duplication state between the duplication cell processing boards 40 and 50, i.e., XFAIL, XACT_STB, FAIL, 20 MCLK, etc.

Figure 6:
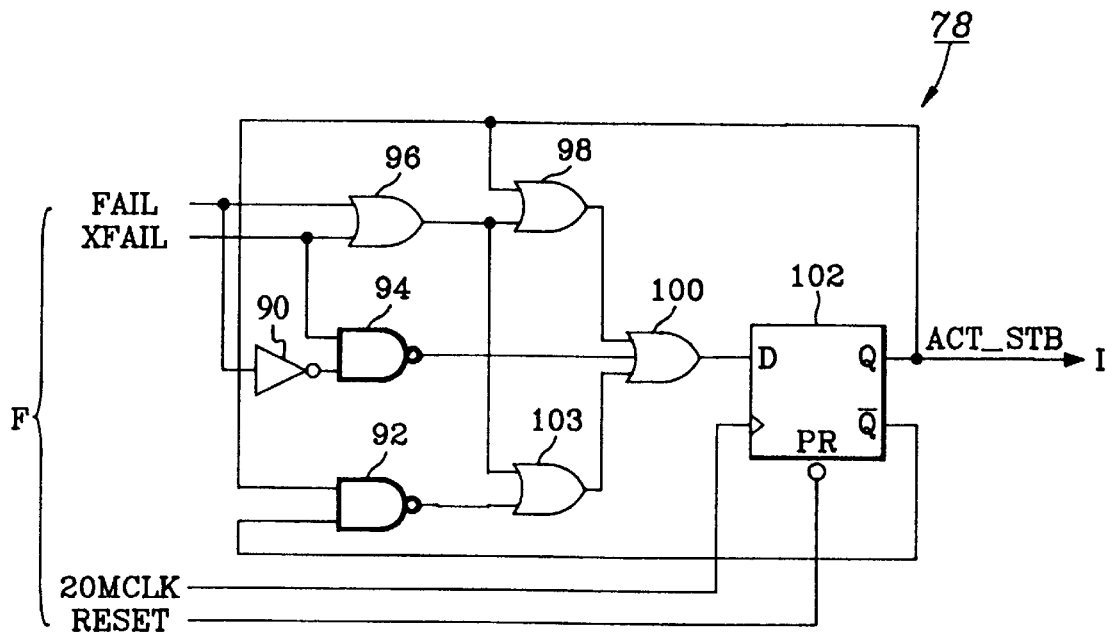
FIG. 6 is a detailed circuit diagram showing the duplication state decider 78.
Figure 7:
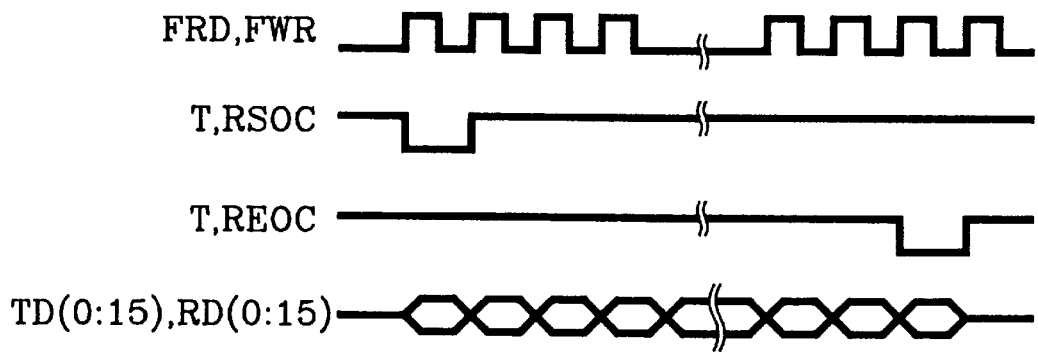
FIG. 7 is a timing diagram of signals between the control serve board 4 and the header conversion processor 10 of FIG. 1.

As illustrated in FIG. 6, the duplication state decider 78 includes an inverter 90, NAND-gates 92 and 94, OR-gates 96, 98, 100, 103 and a D flip-flop 102.

The duplication state decider 78 outputs a signal I for deciding the dual-state, that is, ACT_STB by the following logical operation based on the structure of FIG. 4 after receiving signals F for deciding the dual-state, i.e., XFAIL, XACT_STB, FAIL, 20 MCLK, RESET, etc. As shown below, the signals FAIL, XFAIL and XACT_STB indicate an active low, "/" a negative, and the "signal.Q" being currently output from the D flip-flop 102, the "signal.D" being just previously output from the D flip-flop 102.

$$\text{ACT/STB.Q} = \text{/FAIL */XFAIL *ACT\_STB.D */RESET +}$$
$$\text{/ACT\_STB.D */XACT\_STB.D */FAIL */XFAIL */RESET +}$$
$$\text{/FAIL *XFAIL */RESET}$$

Figure 5:
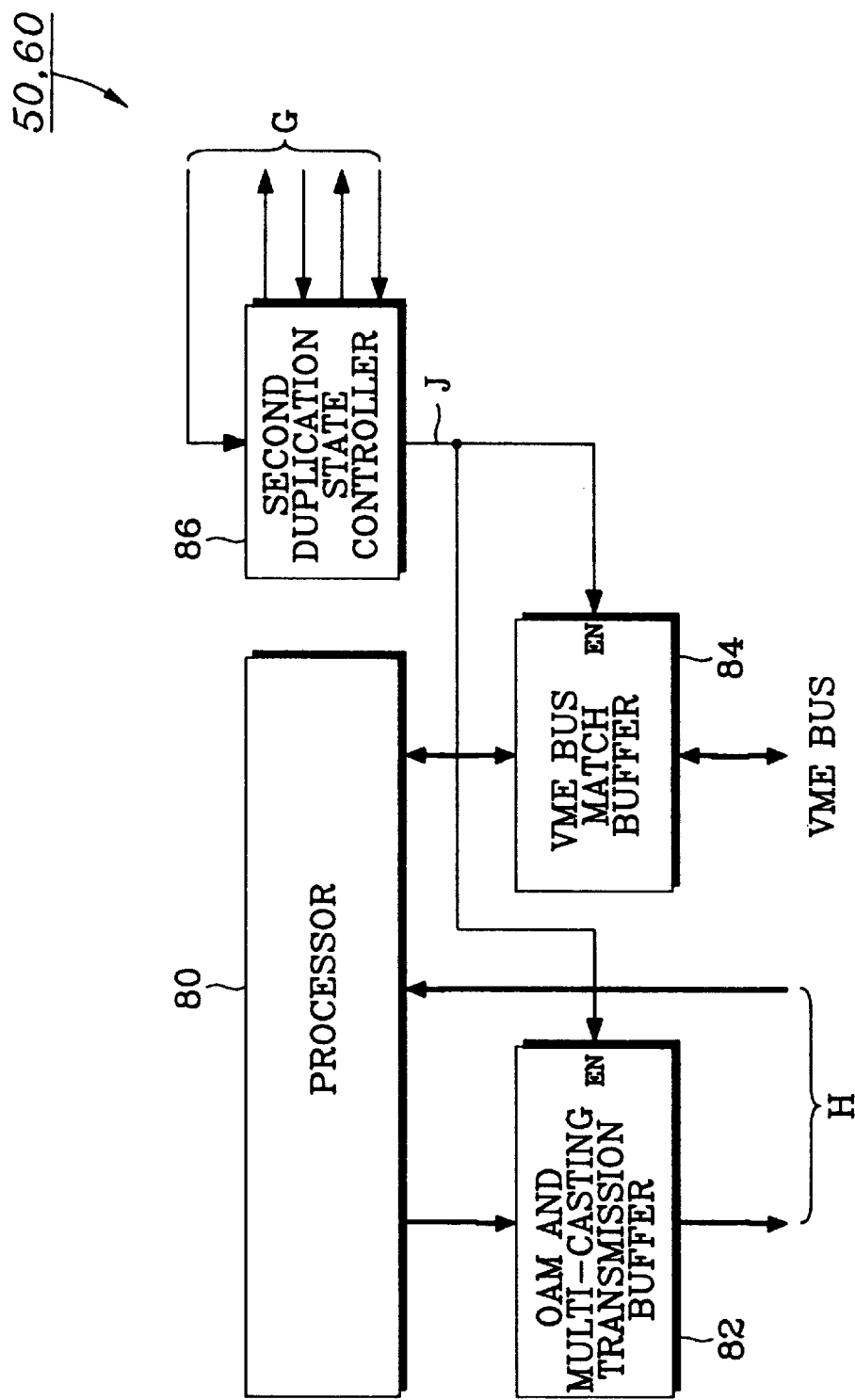
FIG. 5 is a detailed block diagram showing the control boards 50 and 60 of FIG. 2.

As shown in FIG. 5, the control boards 50,60 each include a processor 80, an OAM and multi-casting transmission buffer 82, a VME bus match buffer 84 and a second duplication state controller 86. Signals for externally matching the control boards 50 and 60 include a VME BUS interface signal, an OAM and multi-casting cell match signal H and a signal G for deciding the duplication state between the duplication control boards 50 and 60, i.e., PACT, XPACT, PFAIL, XPFAIL, 20 MHz, etc.

Referring to the above construction, the operation of the present invention will be described below.

The duplication operation according to the present invention is accomplished in active/standby mode with hardware. Therefore, the signals D, E, H, VME BUS, etc., respectively input between duplication boards, i.e., the cell processing boards 30 and 40, and the control boards 50 and 60, are transferred into the active state board as well as the stand-by state board. Thus, each board performs the same operation in accordance with the input base clock, but, between duplication boards, allows the signal outputs D, E, H and VME BUS only in the active state board decided by the duplication state decider. Therefore, when any error occurs in the active mode board, the duplication state decider quickly checks it, and then switches the board to the stand-by mode board.

The operational procedure for processing the connectionless cell will be fully described below.

As illustrated in FIG. 2, the connectionless data, which is a light signal, is input into the physical hierarchy processing board 20. The light signal is transformed into an electric signal by the light transceiver 22 of FIG. 3. The electric signal is processed into a match signal D by the ATM physical hierarchy processor 24 of FIG. 2. The match signal D is applied to the duplication cell processing boards 30 and 40. The cell processing boards 30 and 40 each perform VPI and VCI transformations of the input cell according to the destination address. If the input cell is an OAM cell or a multi-casting cell, it is transferred into the duplication control boards 50 and 60 through the match signal H. Therefore, the control boards 50 and 60 perform cell-copying with a multi-casting cell, while with an OAM cell, the boards transfer it into the cell processing boards 30 and 40 after properly maintaining and repairing it.

As illustrated in FIG. 5, the control boards 30 and 40 enable only the buffers of the "Low" driving side control boards, i.e., the OAM and multi-casting transmission buffer 82 and the VME bus match buffer 84, according to the signals J generated by the duplication state controller 86, that is, PACT_STB. Thus, the match signal H is output only from the enabled control boards, and then transferred into the cell processing boards 30 and 40.

Concerning the header conversion processed cell, the cell processing boards 30 and 40 enable only the physical hierarchy match transmission buffer 70 of the "Low" state driving side in accordance with the signals I decided by the duplication state decider 78, that is, ACT_STB. Thus, the signal D is output only from the enabled cell processing board and transmitted into the physical hierarchy processing board 20. The physical hierarchy processing board 20 processes the signal at the ATM physical hierarchy processor 24, and then transforms it into the light signal by the light transceiver 22 to thereby output it into the light link.

As described above, the duplication system of the present invention is dual-operated with additional hardware so that it can flexibly cope with errors. At the same time, the system quickly switches two boards in active/stand-by mode with hardware to avoid performance reduction due to the duplication operation, and realizes an error observation function so that the uniform state can be always maintained between the two boards.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A device for duplicating a connectionless server, comprising:

physical hierarchy processor means for converting connectionless input data comprising an optical signal into an electric signal, and for ATM physical hierarchy processing said electric signal to obtain matching signals;

duplication cell processor means connected to said physical hierarchy processor means and including first and second cell processors, each of said cell processors performing header conversion processing operations with respect to an input cell of said matching signals according to a destination address thereof, said duplication cell processor means also including a duplication state decider generating a state signal designating one of said first and second cell processors, said duplication cell processor means enabling only buffers of one of said first and second cell processors according to the state signal generated by said duplication state decider with respect to said cell processor which executes said header conversion processing operation; and duplication controller means including first and second control boards for maintaining repairing, multi-casting and connection-controlling cells applied from said duplication cell processor means, said duplication controller means enabling for output only buffers of one of the first and second control boards according to the state signal generated by said duplication state decider with respect to said designated cell processor.

2. The device of claim 1, wherein said physical hierarchy processor means comprises an optical transceiver for receiving said connectionless input data and converting said connectionless input data into an electric signal, an ATM physical hierarchy processor responsive to said electric signal for ATM physical hierarchy processing said electric signal to obtain said matching signals, and a clock generator for generating a clock signal for input to said duplication cell processor means.

3. The device of claim 1, wherein each of said first and second cell processors comprises a cell header conversion unit.

4. The device of claim 3, wherein each of said first and second cell processors further comprises a physical hierarchy match transmission buffer connected to said cell header conversion unit.

5. The device of claim 4, wherein each of said first and second cell processors further comprises an OAM and multi-casting cell transmission buffer connected to said cell header conversion unit.

6. The device of claim 5, wherein each of said first and second cell processors further comprises a VME match buffer connected to said cell header conversion unit.

7. The device of claim 3, wherein each of said first and second cell processors further comprises an OAM and multi-casting cell transmission buffer connected to said cell header conversion unit.

8. The device of claim 7 wherein each of said first and second cell processors further comprises a VME match buffer connected to said cell header conversion unit.

9. The device of claim 3, wherein each of said first and second cell processors further comprises a VME match buffer connected to said cell header conversion unit.

10. The device of claim 3, wherein each of said first and second control boards comprises a duplication state controller for selectively enabling a respective buffer of said each of said first and second control boards.

11. The device of claim 1, wherein each of said first and second control boards comprises a duplication state controller for selectively enabling a respective buffer of said each of said first and second control boards.

12. The device of claim 1, wherein each of said first and second control boards comprises a processor and an OAM and multi-casting transmission buffer connected thereto.

13. The device of claim 12 wherein each of said first and second control boards further comprises a VME bus match buffer connected to said processor.

14. The device of claim 13, wherein each of said first and second control boards comprises a duplication state controller for selectively enabling a respective buffer of said each of said first and second control boards.

15. The device of claim 1, wherein each of said first and second control boards comprises a VME bus match buffer connected to said duplication cell processor means.

16. The device of claim 1, wherein said physical hierarchy processor means processes input signals in a reverse order.

* * * * *